United States Patent [19]

Longhenry

[11] Patent Number: 4,681,222

[45] Date of Patent: Jul. 21, 1987

[54] ORIENTED ARRAY OF SELF-LOCKING FASTENERS

[76] Inventor: Raymond L. Longhenry, HCR 55700 Saber St., Homer, Ak. 99603

[21] Appl. No.: 813,263

[22] Filed: Dec. 24, 1985

[51] Int. Cl.$^4$ .............................................. B65D 85/24
[52] U.S. Cl. ..................................................... 206/347
[58] Field of Search ............................ 411/82, 84, 85; 206/347, 338, 343, 345, 346

[56] References Cited

U.S. PATENT DOCUMENTS

| | | | |
|---|---|---|---|
| 3,812,961 | 5/1974 | Merrick | 206/338 |
| 3,828,925 | 8/1974 | Magyer | 206/346 |
| 4,263,832 | 4/1981 | Lang | 411/82 |
| 4,514,125 | 4/1985 | Stol | 411/82 |

FOREIGN PATENT DOCUMENTS 2843038  4/1980  Fed. Rep. of Germany ...... 405/261

*Primary Examiner*—John E. Murtagh
*Attorney, Agent, or Firm*—Norman B. Rainer

[57] ABSTRACT

A multitude of elongated fasteners are removably held in a uniform array in an assembly comprising a holding panel and at least one air-impermeable compartment associated with each fastener and disposed below the holding panel. The compartment contains a liquid bonding agent which is in contact with the shaft of the fastener. When the fastener is removed from the holding panel and utilized, the holding agent functions as a lubricant which subsequently hardens to lock the fastener in place. The bonding agent may be a two-component composition. The uniformity of the array facilitates robotics handling.

1 Claim, 5 Drawing Figures

ORIENTED ARRAY OF SELF-LOCKING FASTENERS

BACKGROUND OF THE INVENTION

This invention relates to elongated mechanical fastening devices such as bolts, screws, rivets, and the like provided with chemically based self-locking means and disposed in a uniform array amenable to robotic handling.

Various fastening devices have been proposed or used utilizing bonding agents in one way or another to prevent the fasteners from loosening during use or service. Ideally, such a fastener-locking system should be capable of easy manufacture and should have long term stability prior to utilization. In use, the fastening device should be capable of being readily applied with minimal preparative treatment and without undue increase in the amount of work or input torque necessary to install the fastener. Once installed, the bonding agent should rapidly establish a bond such that substantially increased work or back-off torque is required to remove the fastener.

In automated assembly systems utilizing robotic equipment to install fasteners, it is necessary that the fasteners be presented to the robotic equipment in a predictably uniform manner. When bonding agents are used as a component of a self-locking fastener system, the bonding agent must be disposed in a manner such that it will not transfer to and thereby contaminate the robotic apparatus.

U.S. Pat. No. 2,901,099 to Krieble discloses a package containing fasteners and a frangible compartment within the package containing a liquid resin capable of curing to a solid after several hours following contact with the fasteners. In use, the compartment is broken, and its contents are mixed with the fasteners. Because of the random arrangement of the fasteners and the uncertain amount and distribution of bonding agent on each fastener, robotic handling cannot be utilized.

U.S. Pat. No. 3,746,068 to Deckert concerns bolts and screws whose threading contains a tack-free composition of a partially micro encapsulated two-component epoxy adhesive system, permitting the fasteners to be shipped and stored in random array. The shearing forces encountered during installation of the fasteners fracture the capsules to activate the adhesive system.

U.S. Pat. No. 4,425,065 to Sweeney discloses a specially designed fastener device confining a sealed container of adhesive which is ruptured to secure the fastener to a substrate.

U.S. Pat. No. 2,666,354 to Dim et al concerns the use of a donut-shaped container of liquid glue utilized as a washer in conjunction with a wood screw. During installation of the screw, the container ruptures to dispense glue into the hole being entered by the screw.

U.S. Pat. No. 3,913,733 to Flesch, et al, discloses the anchoring of fasteners within smooth bore holes utilizing a two component adhesive intermixed from frangible ampoules during insertion of the fastener into the hole.

It is accordingly an object of the invention to provide an assembly of a multitude of self-locking fasteners in a format amenable to use with robotic equipment for handling said fasteners.

It is a further object of this invention to provide an assembly of the foregoing object wherein individual fasteners may be utilized without affecting subsequent utilization of adjacent fasteners.

It is a still further object of this invention to provide an assembly of the aforesaid nature affording greater ease of use by craftsmen.

It is another object of this invention to provide an assembly of the aforesaid nature wherein said self-locking effect is achieved by way of a storage-stable curable liquid bonding agent stored in association with each fastener.

It is still another object of the invention to provide an assembly of the aforesaid nature wherein a constant amount of said bonding agent is applied to the shank portion of each fastener at the time of its use.

It is a yet another object of the present invention to provide an assembly of the aforesaid nature wherein the liquid bonding agent performs a lubricating function during insertive application of the fastener, and then cures to a solid, whereby the fastener is held in place by mechanical and adhesive forces.

These objects and other objects and advantages of the invention will be apparent from the following description.

SUMMARY OF THE INVENTION

The above and other beneficial objects and advantages are accomplished in accordance with the present invention by a fastener assembly comprising:

(a) a semi-rigid holding panel having upper and lower flat surfaces, (b) a multitude of elongated fasteners having a shaft portion terminating in head and bottom extremities, said fasteners being removably held by said panel in a manner such that the long axis of each fastener is perpendicular to the panel, and the head extremity is above said upper flat surface, said fasteners being uniformly spaced apart in an array having straight lines, and (c) at least one air-impermeable compartment associated with each fastener below said lower flat surface and containing a liquid bonding agent capable of curing to solid form, said compartment being rupturable by the bottom extremity of the fastener to deposit bonding agent upon said shaft portion.

In preferred embodiments of the invention, the fasteners are screws, bolts or rivets of conventional design. The fasteners are preferably identical within a given assembly. However, in specialized embodiments, fasteners of assorted types and sizes may be utilized, particularly where such assortment is required in the assembly of a multi-component structure. The semi-rigid panel is preferably fabricated of a thermoplastic polymer, and the fasteners are held by having been incorporated into the panel during its formation by thermoforming methods. The bonding agent may be a single compostion which cures to solid form by evaporation of a volatile liquid solvent or dispersant; or may be comprised of a first composition which undergoes a hardening chemical reaction when mixed with a second composition comprising a curing agent. Such dual compostion bonding agents generally involve a first composition comprising monomers or prepolymers capable of undergoing polymerization or cross-linking when contacted by a second composition comprising appropriate co-reactive monomers, or activators such as free-radical generators, acids and bases. When dual composition bonding agents are used, the two compostions are kept in separated but adjacent juxtaposition in association with the fastener.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
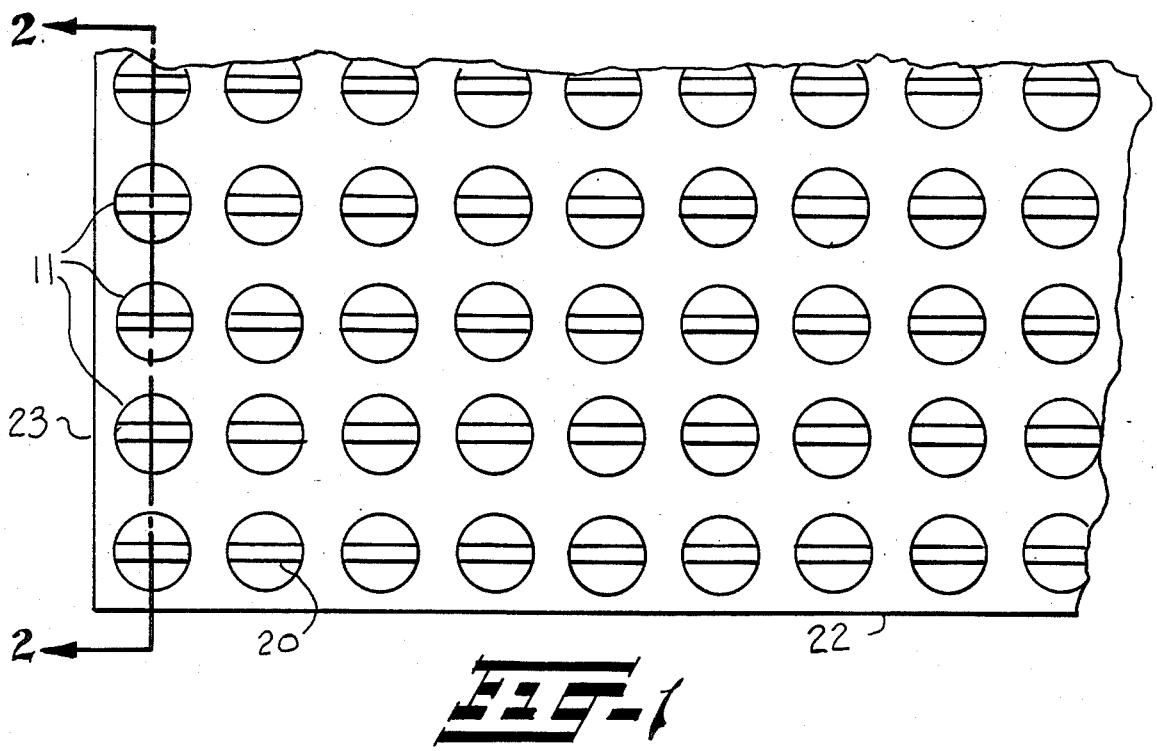
FIG. 1 is a top plan view of a embodiment of the fastener assembly of the present invention.
Figure 2:
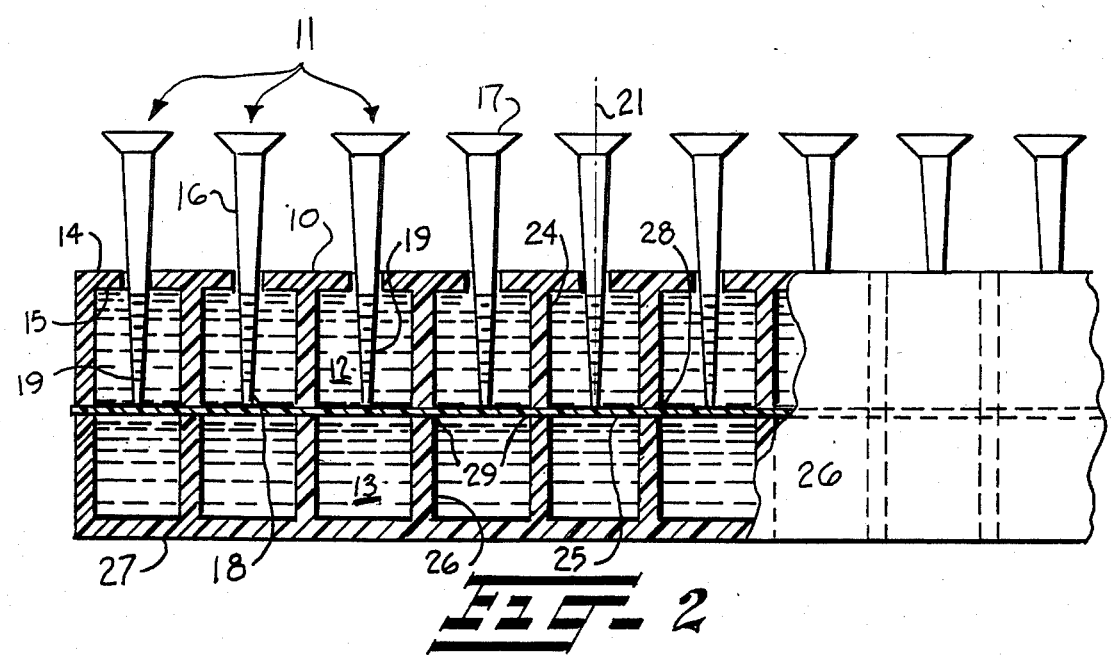
FIG. 2 is a sectional view taken along the line 2—2 of FIG. 1.

Referring to FIGS. 1 and 2, an embodiment of the fastener assembly of this invention is shown comprised of semi-rigid holding panel 10, a multitude of identical wood screws 11 held by said panel, and upper and lower compartments 12 and 13, respectively, associated with each screw and disposed below said panel, said upper compartment confining a first component of a two-component bonding agent, and the lower compartment confining the second component of said bonding agent.

Panel 10 has upper and lower flat surfaces 14 and 15, respectively, uniformly spaced apart between about 1/32" and 4/32", representing the thickness of the panel. The panel is preferably comprised of a thermoplastic polymer such as polyethylene and is preferably made by a casting technique which causes engulfment and retention of pre-postioned screws. The panel is of sufficiently rigid construction to resist bending forces, and seals and fasteners in place so that air cannot pass between the sealing interface. Said sealing engagement however is not so strong as to impede removal of the screws by rotative or axially applied forces. The outer perimeter of the illustrated panel is rectangular, having long and short edges 22 and 23, respectively.

The screws have a shaft portion 16 terminating in a head extremity 17 and pointed bottom extremity 18. The shaft portion, adjacent bottom extremity 18, is provided with a tapered helical thread 19. The head extremity is provided with an engagement slot 20 for a flat-bladed screw driver. The long axis 21 of each fastener is perpendicular to the panel, and the head extremities of the screw lie in the same plane above the upper surface of the panel. The screws are positioned in an array characterized in having straight rows extending in the two perpendicular directions of the perimeter edges, and in perpendicularly intersecting diagonal directions.

In the embodiment of FIGS. 1 and 2, compartment 12 is bounded by rectangularly disposed sidewalls 24 having coplanar straight lower edges 28, frangible sealing film 25 imperviously attached to edges 28, and the lower surface 15 of holding panel 10. Compartment 13 is bounded by rectangularly disposed sidewalls 26 having coplanar straight upper edges 29, sealing film 25 imperviously attached to edges 29, and bottom panel 27 in parallel disposition to holding panel 10. The sidewalls 24 and 26 are in vertical alignment and perpendicularly disposed between holding panel 10 and bottom panel 27. In the embodiment of FIGS. 1 and 2, sidewalls 26 and bottom panel 27 may be portions of a monolithic structure fabricated by a molding operation. Similarly, sidewalls 24 and holding panel 10 may be portions of a monolithic molded structure.

Sealing film 25 may be a single layer structure attached by either adhesives or thermowelding techniques to the edges of both sidewalls 24 and 26. Alternatively, the sealing film 25 may be comprised of upper and lower layers, the upper layer being attached to the lower edges of sidewalls 24, and the lower layer being attached to the upper edges of sidewalls 26. The attachment of the sealing film to the terminal edges of the sidewalls of the upper and lower compartments is accomplished after said compartments are loaded with the components of said bonding agent. It is to be noted that, in the embodiment of FIGS. 1 and 2, the threaded portion of the screw resides within the upper compartment in contact with the first component of the bonding agent therein confined, and poised to puncture film 25.

In use, the fastener is pushed downwardly so that the pointed lower extremity ruptures film 25 and enters the lower compartment. Such action causes mixing of the two components of the bonding agent upon the shank or threaded portion of the fastener with initiation of the curing reaction. In some instances, the fastener may be briefly rotated while in such downward position. The fastener is then withdrawn upwardly through the opening in the holding panel which originally held the fastener. Such action skims off excess bonding agent clinging to the shank portion. The fastener is then insertively applied to a substrate, the still liquid bonding agent providing lubricity. In the case of threaded fasteners such as screws and machine bolts, the torque effect serves to further mix the two components of the bonding agent system.

The bonding agent used in the embodiment of FIGS. 1 and 2 is preferably a two-component epoxy system wherein one component is a liquid polyepoxide prepolymer and other component is a curing agent which causes said prepolymer to solidify. The prepolymer component may for example be a liquid 1, 2—epoxy resin such a 1, 2—epoxy reaction products of polyhydric phenols such as bisphenol-A and epichlorohydrin or polyglycidyl ether, epichlorohydrin with phenolformaldehyde condensation polymers and epichlorohydrin with amine phenols.

The preferred polyepoxides contain an average of more than 1 and generally more than an average of about 1.5 oxirane groups per molecule. Examples of the preferred resins are liquid polyglycidyl ethers of bisphenol-A which have slightly less than two oxirane groups per average molecular weight (for example, Epon 815, or ERL-2795). Examples or resins having more than 2 oxirane groups per average molecular weight are polyglycidyl ethers of phenol-formaldehyde novolaks (for example, D.E.N. 438, which has a functionality of 3.6, or the trifunctional novolak Epiphen E.R. 823). When highly viscous resins such as the latter, or even solid resins are used, for example, in order to provide some desired property such as temperature resistance, etc., it is preferred to form a blend with a less viscous resin such as ERL-2795. Further suitable resins include polyglycidyl ethers obtained from the reaction of dihyric or polyhydric alcohols with epichlorohydrin, for example, resins made by condensing epichlorohydrin and glycerin to give di- and tri-epoxides having a functionality of about 2.2 (e.g. Epon 182) and polyglycol polyepoxides such as the diglycidyl either of polypropylene oxide (e.g., DER 736). Further examples will be apparent to those skilled in the art.

For the preferred epoxy resin systems, it has been found that there are several important characteristics for the curing agent used. Firstly, in order to be useful, the curing agent should cure the resin to a tough infusible state within about 24 hours at room temperature. Preferred curatives, however, produce a significant amount of cure within a shorter time, within a few minutes up to about 6 hours, also, it is important that the curative be substantially non-volatile and capable of being stored at 120 degrees F., exposed to the atmoshpere for at least about 1 week without losing more than 2 percent of its weight. Curatives having this characteristic have been found to be useful in forming adhesives having long term storage stability at ambient temperatures. Preferably the curative should not lose more than 2 percent weight when a 2.0 gram sample is heated in an open vessel in a non-circulating oven heated to 136 degrees F. (temperature fluctuation being controlled to within ±2 degrees ) for 12 days.

A third very important characteristic is that the amine must have at least about 50 or more atomic weight units per amine group. Amines have a higher functionality than this (i.e., less than about 50 molecular weight units per amine group), while often being good room temperature curatives, may produce instability by attacking the walls of the compartments.

The substantially non-volatile curing agent may be in either solid or liquid form so long as it is miscible with the resin used, i.e., will rapidly dissolve when mixed with the resin. The miscibility of the amine in the resin can be determined by means of a simple "spatula" test by placing resin in a container and mixing in a chemically equivalent amount of the amine while stirring slightly with a spatula. Amines which are sufficiently miscible in the resin will convert the resin to a hard infusible solid within about 18 hours. Other useful amines will dissolve in significant amounts and cause an increase in viscosity within this time period, but may require as much as 7 days to reach a hard resin stage. The latter curatives can be used in cases where the longer cure times are not a problem. If the amine is not sufficiently miscible with the resin, cure will not occur.

Examples of suitable substantially non-volatile amine during agents for polepoxide resins are: imidazole, 1, 3-bis-4-piperidyl propane, 1,6-hexane diamine, 4,4'-methylenedianiline, substituted alkylene diamines and liquid polyamine resins such as Versamine 125 ( a dimerized unsaturated fatty acid reacted with alkylene diamines). It will be understood that curing agents which are in themselves volatile can sometimes be converted by chemical reaction to a substantially novolatile form. For example, liquid amines can be reacted with acids to form solid amine salts having reduced vapor pressure. For example, the tetraethylene pentamine can be reacted with a fatty acid to give a salt useful as a curing agent.

The preferred amine curing agents for polyepoxide resins are strongly basic amines which in saturated solution in water will have a pH of at least about 9.5. Amines more weakly basic than this tend to provide a cure rate for the adhesive less than the optimum. The curing rate is generally employed in approximately a stoichiometric amount. However, those skilled in the art will recognize that lesser amounts can be used in the case of curatives which have a catalytic curing effect on the resin.

In order to assure that a proper amount of bonding agent is applied to the shaft of the fastener, it is important that the viscosity of the bonding agent as applied to the shaft be within the range of about 4 and 80 poises, measured at 25 degrees C. Substances having a viscosity below 4 poises have a water-like consistency, and will not adequately cling to the shaft. Substances having a viscosity above about 90 poises begin to have tar like consistencies which places too much bonding agent on the shaft and produces stringing when the fastener is removed from the holding panel.

Figure 3:
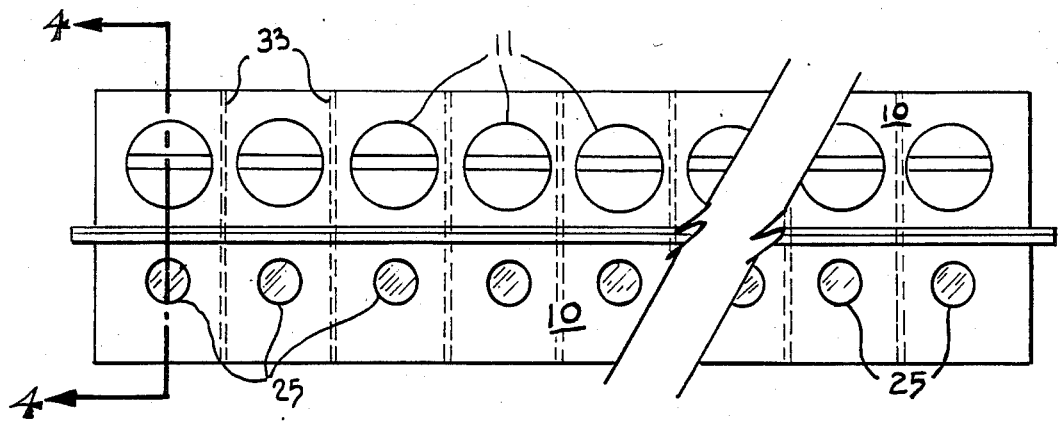
FIG. 3 is a top plan view of another embodiment of the fastener assembly of this invention.
Figure 4:
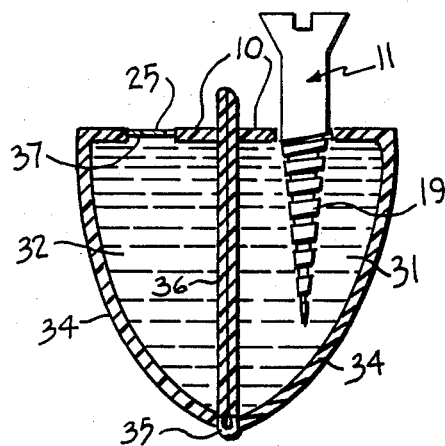
FIG. 4 is a sectional view taken along the line 4—4 of FIG. 3.
Figure 5:
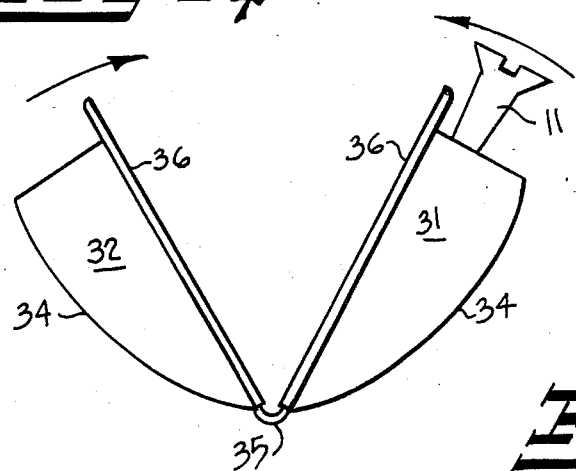
FIG. 5 is an end view of the embodiment of FIG. 3 shown in opened position.

In the embodiment of the fastener assembly exemplified in FIGS. 3-5, the holding panel and compartments are shown in the form of a clam-shell type closure system utilizing contiguous side by side compartments 31 and 32 containing first and second components of a two component bonding agent. The compartments are bounded by parallel flat vertical sidewalls 33, continuous outer curved sidewall 34 and upper holding panel 10. A wood screw 11 is held by said holding panel in association with each compartment 31. The upper extremity of each compartment 32 is provided with a circular aperture 37 sealed by sealing film 25. In use, the screw is removed upwardly from compartment 31 and inserted through film 25 of associated compartment 32, causing the second component of the bonding agent to contact threaded portion 19. The screw is then removed upwardly for use. In order to facilitate fabrication, the fastener assembly of FIGS. 3-5 is made in two sections which pivot about a thin integral plastic hinge 35, causing interior sidewalls 36 to come into abutting engagement. The other features of construction and manner of use are otherwise analogous to the embodiment of FIGS. 1 and 2.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An assembly of self-locking fasteners comprising:
   (a) a semi-rigid holding panel having upper and lower flat surfaces,
   (b) a multitude of elongated fasteners, each having a shaft portion terminating in head and bottom extremities, said fasteners being removably held by said panel in a manner such that the long axis of each fastener is perpendicular to the panel and the head extremity is above said upper flat surface, said fasteners being uniformly spaced apart in an array having straight lines, and
   (c) at least one air-impermeable compartment associated with each fastener below said lower flat surface and containing a liquid bonding agent having a viscosity within the range of about 4 poises and 80 poises, measured at 25 degrees C., and capable of curing to solid form, the shaft portion of said fastener being immersed in said bonding agent.

* * * * *